(Model.)

G. WESTINGHOUSE, Jr.
COMPOUND HOSE COUPLING.

No. 243,822. Patented July 5, 1881.

Witnesses
C. L. Parker
R. H. Whittlesey

Inventor George Westinghouse Jr.
By Attorney George H. Christy

UNITED STATES PATENT OFFICE.

GEORGE WESTINGHOUSE, JR., OF PITTSBURG, PENNSYLVANIA.

COMPOUND HOSE-COUPLING.

SPECIFICATION forming part of Letters Patent No. 243,822, dated July 5, 1881.

Application filed April 25, 1881. (Model.)

*To all whom it may concern:*

Be it known that I, GEORGE WESTINGHOUSE, Jr., of Pittsburg, county of Allegheny, State of Pennsylvania, have invented or discovered a new and useful Improvement in Compound Hose-Couplings; and I do hereby declare the following to be a full, clear, concise, and exact description thereof, reference being had to the accompanying drawings, making a part of this specification, in which—like letters indicating like parts—

Figure 1:
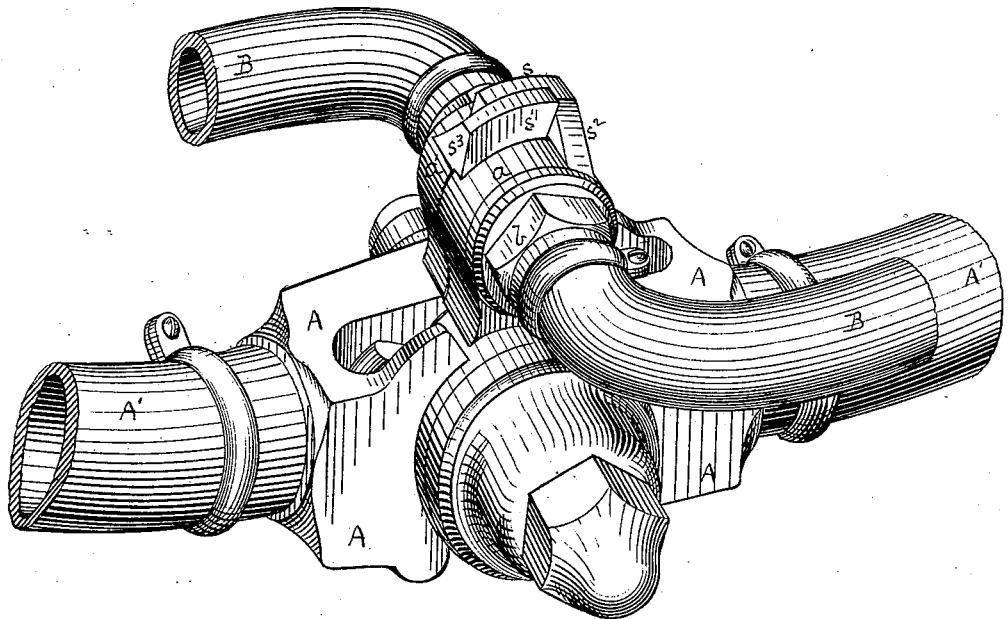
Figure 2:
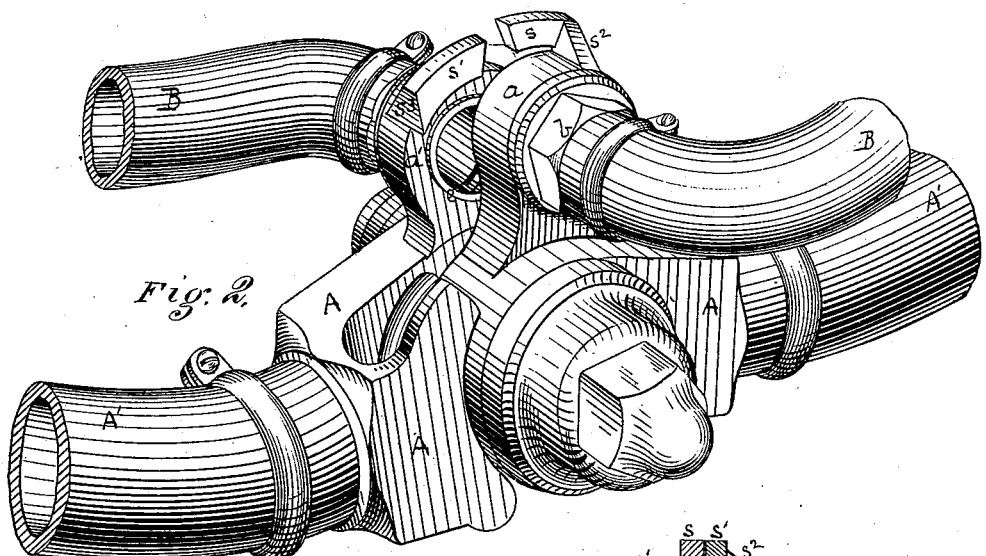

Figure 1 is a view, in perspective, of two parts or halves of my compound coupling coupled together, and also showing the ends of the flexible hose employed in connection therewith. Fig. 2 is a like view of the same, but showing the position of the devices while in the act or operation of being coupled, a little before the holding-lugs of the added parts come into engagement; and Fig. 3 is a sectional view, through the added coupling and through the adjacent side of the shell, of the main coupling.

My present invention relates to the construction of a compound coupling, such as may be adapted for use in uniting simultaneously two independent lines of pipe or tubing, or, in other words, to couplings having on each half two independent or separate lines of through-way communication for the flow or transmission of fluids by either compression or exhaustion, whereby both of such lines may simultaneously and by the same motion or motions be united with corresponding independent lines in the counterpart or corresponding half of a double or compound coupling; and the class of couplings to which I apply my present improvement is that sometimes known as a "lap-joint" coupling, in which each half laps onto the other half so far or to such extent as to be supported, as against lateral displacement, on the side so supported. While such is the characteristic feature of the main coupling, the added parts, which make the joint or union for the added line, may be either a lap or a butt joint.

While this improved coupling is adapted generally for joining the meeting ends of independent or separate lines of pipes or tubes, I have designed it with primary reference to its use in power-brake apparatus, whether operated by the compression or the exhaustion of air. In such apparatus two lines of brake-pipe are sometimes required, or one line of brake-pipe and one line of signaling-pipe; and when I speak of the two lines as independent or separate, I do not mean to exclude such constructions or arrangements of such lines as call or provide for a branch or cross connection from one to the other, provided the substantial continuity of each line from one coupling to the next is preserved, even though such continuity be secured through a switch-pipe common to both.

Figure 3:
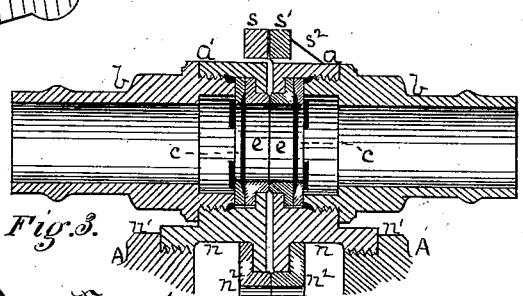

In order to illustrate my present invention, I have shown in the drawings at A A the two halves of the Westinghouse clutch or lap-joint coupling now in general use, and so well known that it need not be described at length, though in Fig. 3 I have shown in section one side of the main coupling-shells at $n$, the edges of the screw-caps $n'$, and the packing-rings $n^2$. Each half-coupling is connected with the fixed pipes under the cars by flexible hose-sections $A'$, in the usual way, and these sections constitute a part of the air-conduit employed in the ordinary working of the brake. On the side or edge of each half-coupling opposite the usual stop-posts I make, integral with or fixedly attached to the coupling-shell, a tubular socket or coupling case or shell, $a$ or $a'$, in such position that when the two half-couplings are united the adjacent open ends of the added shells $a$ $a'$ will nearly or quite abut one on the other in the same plane as the meeting faces of the main coupling. The outer end of each such coupling-shell is tapped for the attachment of a thimble, $b$, to the outer end of which a section of flexible hose, B, is attached in the usual way, and these flexible sections are made of suitable length to be attached at their outer ends to fixed pipes beneath the cars, which, running lengthwise of the same from end to end, constitute, with the hose B and shells $a$ $a'$, the separate or added line. The inner end of each thimble bears on a metallic washer, $c$, and thereby clamps in place a rubber packing-ring, $e$, similar in shape to the main packing-ring $n^2$ of the main coupling. These packing-rings $e$ $e$ are so proportioned, shaped, and inserted that when they are brought into line with each other, or so that their axes will be in line, they will bear one against the other and form a practically air-tight joint, as against the amount or degree of pressure required in the added line, and such closeness of joint may be secured either by the compressive force applied in screwing in the thimbles, or, the washers $c$ being made with a larger bore, by the compressive force of the air-pressure employed; or both these or other suitable means may be employed to secure the result specified.

As illustrated in the drawings, Fig. 3, the washers are beveled on their inner edges next to the packing-rings, so that the packing-rings, while projecting sufficiently to make a tight joint, may readily yield a little in the making of the joint, and when the joint is made be pressed into a closer engagement under the effect of air-pressure acting back of them.

Another part of my invention relates to the addition of holding or interlocking devices capable of being brought into an interlocking engagement on the uniting of the main couplings, so as to prevent the partial separation of the coupling-shells $a\ a'$, or to counteract their tendency to separate on the side opposite their points of attachment to the main coupling-shells, and thereby I prevent all danger of a consequent leak at that point. From the outer side of the socket or shell $a\ a$ rib $s^2$ projects outward and along forward, and on the outer end of the same is a locking-lug, $s$, the back face of which is in the plane of junction of the packing-rings $e$. Also, from the outer side of the other socket or shell, $a'$, a like rib, $s^3$, projects outward and forward, and on the outer end of the same is a locking-lug, $s'$, the back face of which is in the same plane. The points of attachment, form, and construction of these devices, and the manner in which the lugs $s\ s'$ interlock, by sliding the one on the other during the rotary motion of the main couplings, are so clearly illustrated in the drawings that further description is unnecessary; and it will particularly be observed that the ribs $s^2\ s^3$ project out from the thimbles a little away from the extreme outer periphery of the shells or sockets and over to one side in the direction toward which the couplings will move relatively to each other when forcibly pulled apart.

While I have described the joints thus formed as being in the same plane, such construction is not absolutely essential, since the joint formed by the packing-rings $e\ e$ may be at any desired angle to the plane of the other or main joint, provided only that the uniting of the main lap-joint couplings shall bring the added couplings into the line with each other and perfect the joint; but in such case, of course, other fastening devices for the added coupling should be provided. Also, the form of the shells $a\ a'$ may be varied at pleasure, and other like modifications may be made, such as still retain the substantial features of invention herein described and claimed.

I claim herein as my invention—

1. In combination with a pair of lap-joint couplings, a pair of auxiliary or added coupling sockets or shells, $a\ a'$, integral therewith, for coupling together or uniting the meeting ends of an independent line of pipe, substantially as set forth.

2. In combination with clutch-couplings A A, a pair of added or auxiliary couplings for an independent or separate line, consisting of tubular sockets or shells, thimbles, and packing-rings, and with or without interlocking or engaging lugs, substantially as set forth.

3. A half-coupling, A, having a coupling socket or shell, $a$, integral therewith, provided with packing-ring $e$ and holding-lug $s$, substantially as set forth.

In testimony whereof I have hereunto set my hand.

GEORGE WESTINGHOUSE, JR.

Witnesses:
R. H. WHITTLESEY,
GEORGE H. CHRISTY.